US006537056B1

United States Patent
Omi et al.

(10) Patent No.: US 6,537,056 B1
(45) Date of Patent: Mar. 25, 2003

(54) NEEDLE BLOW NOZZLE AND BLOW MOLDING APPARATUS

(75) Inventors: Yuzo Omi, Saitama-ken (JP); Syouji Satou, Saitama-ken (JP); Takatoshi Watanabe, Saitama-ken (JP); Akira Rikiishi, Saitama-ken (JP); Hajime Kudo, Saitama-ken (JP); Yoshitaka Ohno, Kanagawa-ken (JP); Toshio Kagitani, Kanagawa-ken (JP); Sohei Masaki, Kanagawa-ken (JP); Shoji Abe, Kanagawa-ken (JP)

(73) Assignees: The Japan Steel Works, Ltd., Tokyo (JP); Yachiyo Kogyo Kabushiki Kaisha, Saitama-Ken (JP)

( * ) Notice: Subject to any disclaimer, the term of this patent is extended or adjusted under 35 U.S.C. 154(b) by 0 days.

(21) Appl. No.: 09/407,864

(22) Filed: Sep. 29, 1999

(30) Foreign Application Priority Data

Sep. 30, 1998 (JP) .............................. 10-277958

(51) Int. Cl.⁷ ........................... B29C 49/60; B29C 49/66
(52) U.S. Cl. ........................................ 425/526; 425/536
(58) Field of Search .............................. 425/526, 535, 425/536; 264/528

(56) References Cited

U.S. PATENT DOCUMENTS

| 3,167,817 A | | 2/1965 | Zalkind ........................ 425/525 |
| 3,450,805 A | | 6/1969 | Chesser ....................... 425/526 |
| 3,694,424 A | * | 9/1972 | Hunkar et al. ............... 425/526 |
| 3,869,236 A | * | 3/1975 | Schonewald ................. 425/535 |
| 3,915,611 A | * | 10/1975 | Peters .......................... 425/535 |
| 4,091,059 A | * | 5/1978 | Ryder .......................... 425/526 |
| 4,151,250 A | * | 4/1979 | Barry et al. ................. 425/526 |
| 4,597,268 A | * | 7/1986 | Andersson ..................... 62/93 |
| 5,078,948 A | | 1/1992 | Troutman et al. ........... 425/536 |
| 5,565,165 A | * | 10/1996 | Matsuhashi ................. 425/536 |
| 5,759,475 A | * | 6/1998 | Takakusaki et al. ........ 425/526 |
| 5,795,533 A | * | 8/1998 | Mehnert ...................... 425/536 |

FOREIGN PATENT DOCUMENTS

| JP | 05104615 A | * | 4/1993 |
| JP | 06234153 A | * | 8/1994 |
| JP | 09216277 A | * | 8/1997 |

OTHER PUBLICATIONS

Computer translation of JP–09–216277 A from JPO website (no date).*

* cited by examiner

Primary Examiner—Robert Davis
(74) Attorney, Agent, or Firm—Sughrue Mion, PLLC

(57) ABSTRACT

In a conventional needle blow nozzle and blow molding apparatus, because a needle portion is formed to have a linear tip, resistance against insertion of the nozzle into a parison is large and only a small-diameter needle blow nozzle can be inserted into the parison. For this reason, it has been difficult to increase an amount of air supplied to the interior of the parison and to shorten the molding cycle. With a needle blow nozzle, an air cooling method and apparatus, a blow molding method and apparatus, and a blow molded product according to the present invention, since a needle portion of the needle blow nozzle is formed into an umbrella-like shape, the tip of the needle portion provides a pointed needle center so that resistance against insertion of the nozzle into a parison is reduced and a large-diameter needle blow nozzle can be employed.

6 Claims, 7 Drawing Sheets

(SHAPE AFTER CUTTING)　　　(SHAPE AFTER MOLDING)

(B)　　　(A)

NEEDLE BLOW NOZZLE AND BLOW MOLDING APPARATUS

BACKGROUND OF THE INVENTION

1. Field of the Invention

The present invention relates to a needle blow nozzle, an air cooling method and apparatus, a blow molding method and apparatus, and a blow molded product. More particularly, the present invention relates to a novel improvement in that a needle portion at the tip of a needle blow nozzle is formed into an umbrella-like shape having an acute apical angle and a larger diameter, thus enabling the larger-diameter needle blow nozzle to be laterally inserted into a parison with certainty and a large amount of cooling air to be supplied and discharged, whereby the parison cooling ability is increased and the molding cycle is shortened.

2. Description of the Related Art

FIGS. 1 and 2 show one example of a blow molding apparatus, disclosed in Japanese Unexamined Patent Publication No. 6-182866, which employs a conventional needle blow nozzle (often called a lateral blow nozzle) of the above-mentioned type. Referring to FIGS. 1 and 2, numeral 1 denotes a needle blow nozzle having a tubular body 4. A slope 11 is formed at the tip of the tubular body 4 by obliquely cutting the tubular body 4. In other words, the nozzle tip is constructed into a similar shape as a syringe needle used in medical treatment. The tubular body 4 has a penetration bore 4aA formed therethrough for communicating with a nozzle hole 20 of the slope 11.

The conventional needle blow nozzle of the blow molding apparatus, constructed as described above, has problems below.

The tip of the conventional needle blow nozzle has a shape resulted from simply obliquely cutting the tubular body 4. Viewing the slope at the nozzle tip from the axial direction, the nozzle hole is largely opened and therefore a tip shape of a needle inserted into a parison from its outer surface is not dot-like but linear. Thus resistance against insertion of the needle into the parison has increased, it is not easy to insert the needle into the parison. For this reason, the nozzle diameter has a maximum limit at 8 mm. The nozzle having an 8 mm diameter however cannot quickly provide a large amount of cooling air into a molded product. Another method of pinching upper and lower portions of a parison and piercing air nozzles through pinched portions (59c, 59d; see FIG. 9) is disadvantageous in that the wall thickness of the pinched portions must be increased to compensate for a reduction of strength, the shape of the pinched portions is complicated, and the molding cycle is prolonged.

Generally, as a parison under molding is cooled more rapidly, the molding cycle is more shortened and the production efficiency is more increased. It is however difficult to increase the diameter of the conventional needle blow nozzle because an increase of the diameter makes it harder to insert the nozzle. In spite of such a difficulty, there has been a demand in the field of relevant art for cooling a molded product in a shorter time and reducing the molding cycle by employing a larger-diameter needle spray nozzle.

SUMMARY OF THE INVENTION

With the view of solving the problems set forth above, an object of the present invention is to provide a needle blow nozzle, an air cooling method and apparatus, a blow molding method and apparatus, and a blow molded product, with which a needle portion at the tip of the needle blow nozzle is formed into an umbrella-like shape having an acute apical angle and a larger diameter, thus enabling the larger-diameter needle blow nozzle to be laterally inserted into a parison with certainty and a large amount of cooling air to be supplied and discharged, whereby the parison cooling ability is increased and the molding cycle is shortened.

To achieve the above object, the present invention provides a needle blow nozzle having an elongate tubular body, the nozzle being laterally inserted into a parison held between a pair of molds for blow molding, and jetting air to the interior of the parison, wherein a needle portion formed at a fore end of the tubular body has a needle center positioned at an axis of the tubular body, slopes providing edges extending at an acute angle are formed to extend from the needle center toward an outer peripheral surface of the tubular body, and nozzle holes are formed in the needle portion. At least two elongate cutting areas extending in the axial direction are formed in the slopes, fore ends of the elongate cutting areas are converged to the needle center, and the nozzle holes are positioned between the elongate cutting areas. Also, the present invention provides an air cooling method comprising the steps of attaching a cap-like circulation jig to a needle portion of a needle blow nozzle provided at a side of at least one of a pair of molds for blow molding, supplying high-pressure air from a high-pressure air source to the needle blow nozzle through an air cooling apparatus in a circulating manner, and pre-cooling the high-pressure air prior to closing the molds. Further, the present invention provides an air cooling apparatus comprising a needle blow nozzle provided at a side of at least one of a pair of molds for blow molding, a cap-like circulation jig detachably attached to a needle portion of the needle blow nozzle, an air cooling apparatus connected to the needle blow nozzle, and a high-pressure air source connected to the air cooling apparatus and supplying high-pressure air, the high-pressure air being circulated through the air cooling apparatus to pre-cool a high-pressure air circuit while the circulation jig is held attached to the needle portion. Still further, the present invention provides a blow molding method comprising the steps of laterally inserting a needle blow nozzle into a parison held between molds for blow molding, jetting air to the interior of the parison, and producing a blow molded product, wherein the air is supplied to the parison while being cooled with an air cooling apparatus and adiabatic expansion of high-pressure air. Still further, the present invention provides a blow molding method comprising the steps of piercing a needle blow nozzle into a parison held between molds, and producing a molded product, wherein a driving circuit for driving the needle blow nozzle to pierce the parison is operated at a high speed by increasing the pressure from a driving source, increasing an air flow rate through a solenoid valve, flow passages of hoses and a silencer, and providing a reservoir tank to compensate for deficiency of pressure supply from the driving source. Still further, the present invention provides a blow molding apparatus for molding a blow molded product by laterally inserting a needle blow nozzle into a parison held between a pair of molds for blow molding, and jetting air to the interior of the parison, wherein an air cooling apparatus is connected to the needle blow nozzle. In the above blow molding apparatus, a needle portion formed at a fore end of a tubular body of the needle blow nozzle has a needle center positioned at an axis of the tubular body, slopes providing edges extending at an acute angle are formed to extend from the needle center toward an outer peripheral surface of the tubular body, and nozzle holes are formed in the needle portion. In addition, at least two elongate cutting areas extending in the axial direction are formed in the slopes, fore ends of the elongate cutting areas are converged to the needle center, and the nozzle holes are positioned between the elongate cutting areas. Still further, the present invention provides a blow molded product having one or more mouths, wherein the mouths are partly cut off to remove holes formed therein. Still further, the present invention provides a blow molded product produced with blow molding by injecting air into a parison held between molds through a needle blow: nozzle, wherein air is injected into the parison through the needle blow nozzle provided at a side of the molds, and holes used for injecting the air are formed in mouths formed on the blow molded product during the blow molding of the parison.

DESCRIPTION OF THE PREFERRED EMBODIMENTS

Preferred embodiments of a needle blow nozzle, an air cooling method and apparatus, a blow molding method and apparatus, and a blow molded product according to the present invention will be described below with reference to the drawings. It is to be noted that identical or equivalent parts to those in the conventional needle blow nozzle are denoted by the same numerals in the following description.

Figure 1:
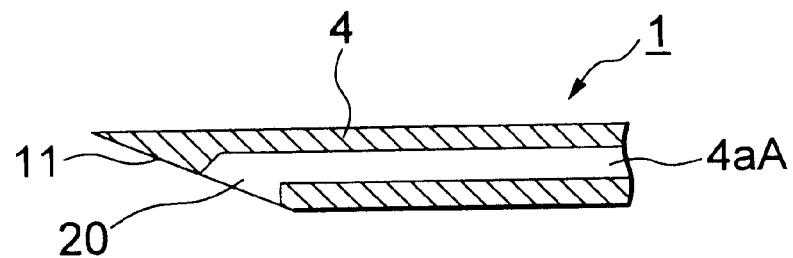
FIG. 1 is a sectional view of a conventional needle blow nozzle.
Figure 2:
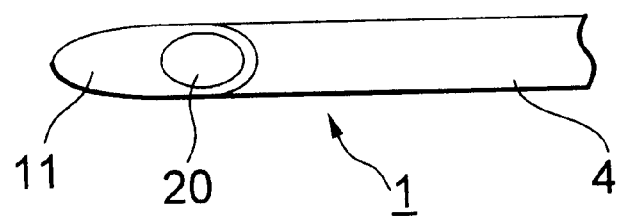
FIG. 2 is a bottom view of the conventional needle blow nozzle shown in FIG. 1.
Figure 3:
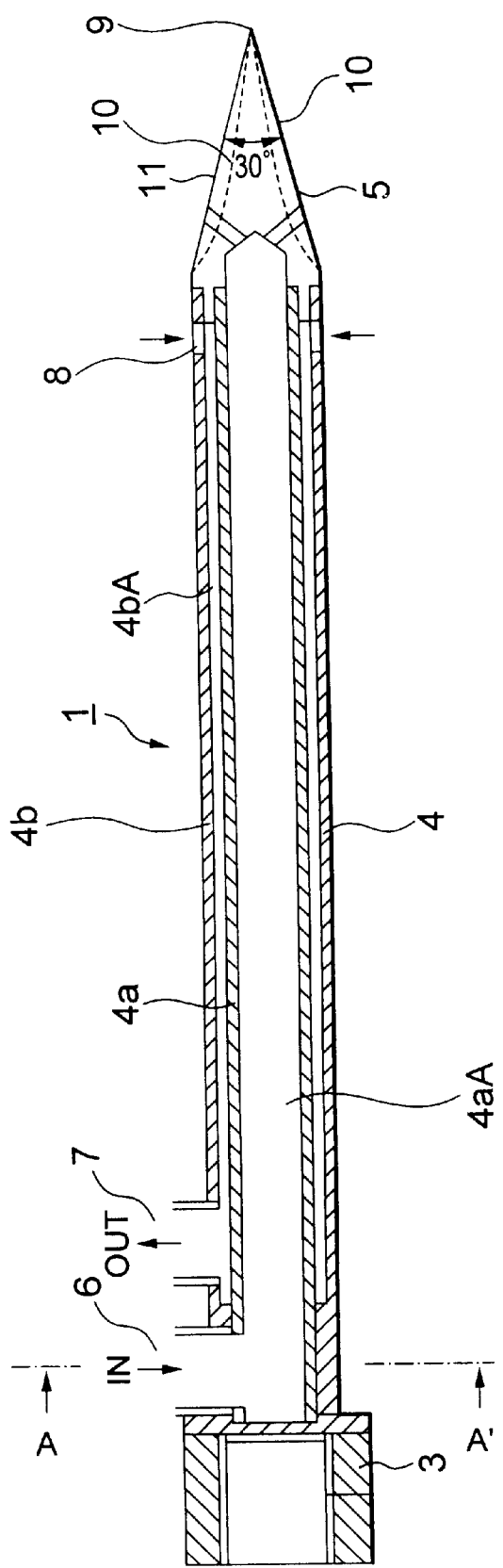
FIG. 3 is a sectional view of a needle blow nozzle according to the present invention.
Figure 6:
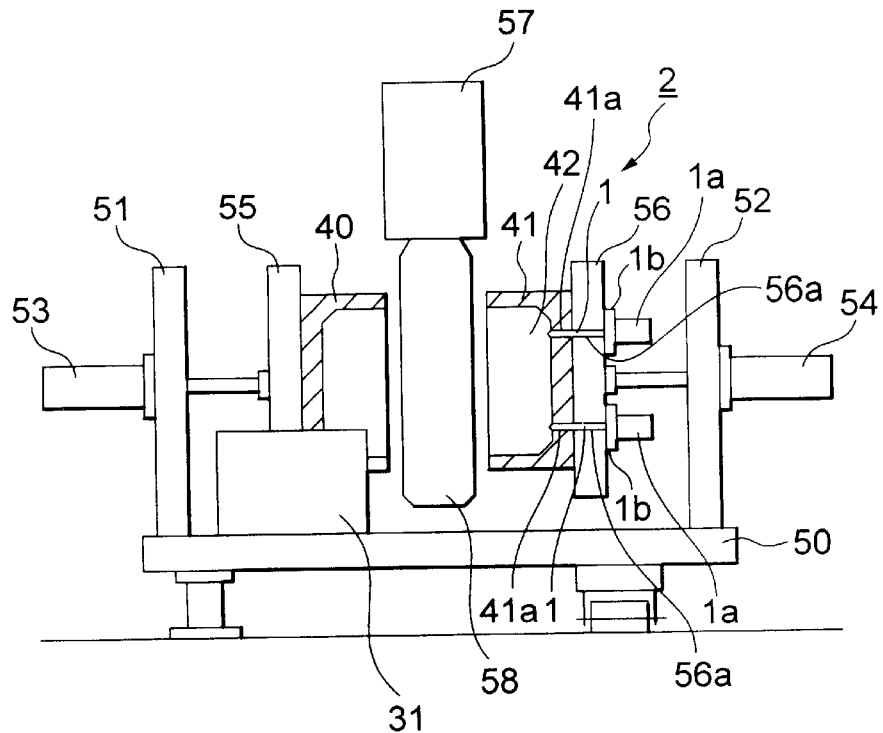
FIG. 6 is a front view showing a blow molding apparatus according to the present invention.
Figure 7:
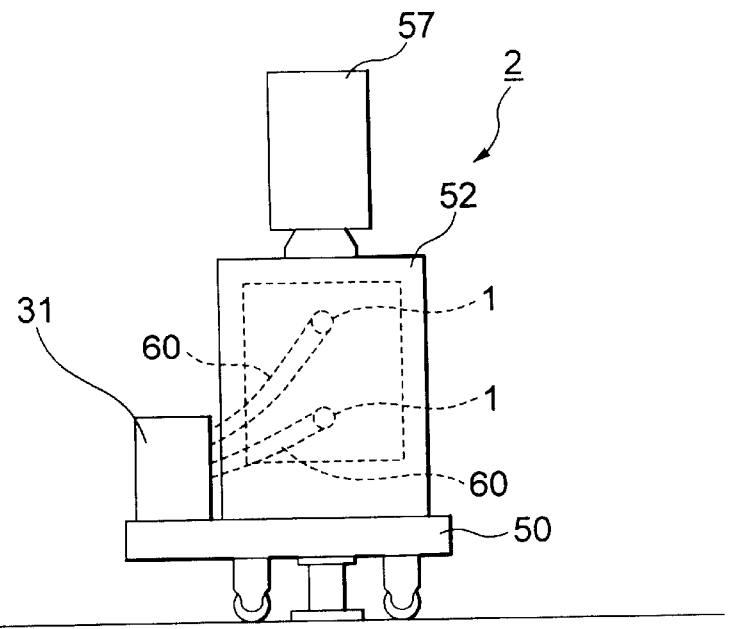
FIG. 7 is a right side view of the blow molding apparatus of FIG. 6.
Figure 9:
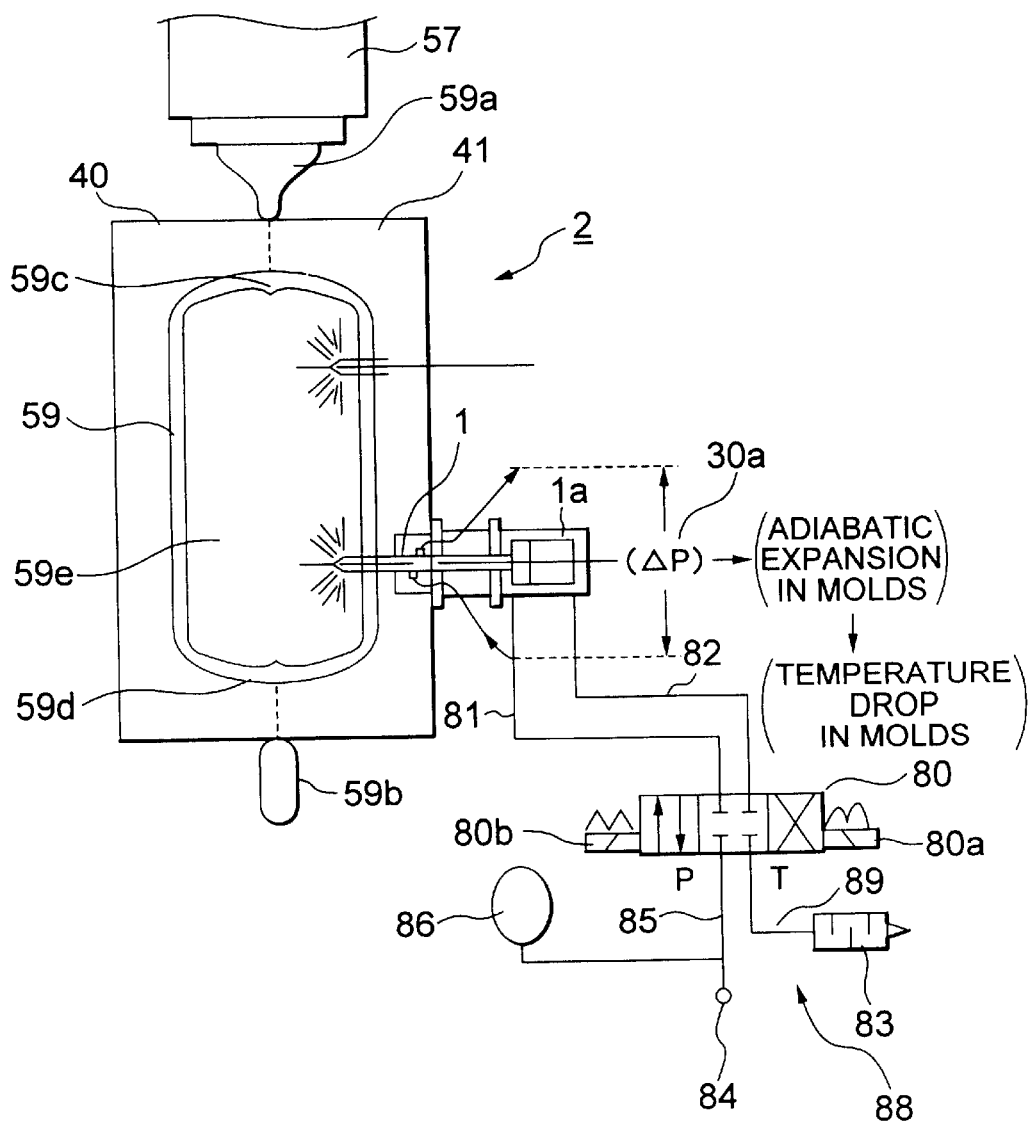
FIG. 9 is an explanatory view showing a blow molding step using molds shown in FIG. 6.

Referring to FIG. 3, numeral 1 denotes a needle blow nozzle for use in a blow molding apparatus 2 shown in FIGS. 6, 7 and 9. The needle blow nozzle 1 comprises a base portion 3, a tubular body 4, and a needle portion 5 at a fore end. The tubular body 4 is in the form of a double cylindrical wall tube made up of a first tubular portion 4a and a second tubular portion 4b. Incidentally, the tubular body 4 is not limited to the illustrated double cylindrical wall tube, but may be formed of one tubular portion 4a or 4b, i.e., a single cylindrical wall tube.

An air inlet 6 is formed in the first tubular portion 4a, and an air outlet 7 is formed in the second tubular portion 4b. Further, air suction ports 8 are formed at a fore end of the second tubular portion 4b. The air suction ports 8 are communicated with the air outlet 7 through a second blow portion 4bA defined in the second tubular portion 4b.

Figure 5:
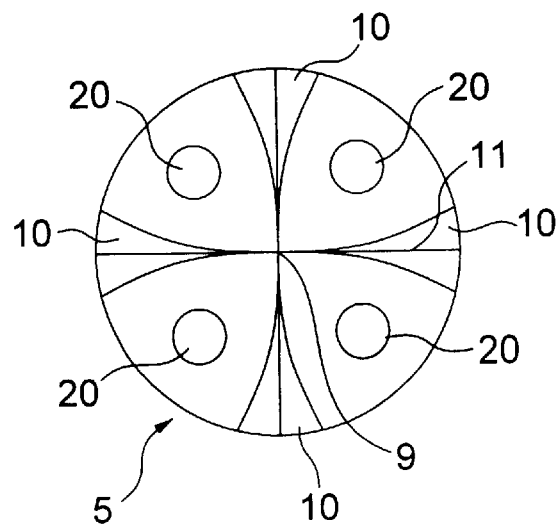
FIG. 5 is a right side view showing a fore end of the needle blow nozzle of FIG. 3.

As also shown in FIG. 5, the needle portion 5 is formed to have an umbrella-like shape in its entirely, and a pointed needle center 9 at the tip of the needle portion 5 is positioned at an axis of the tubular body 4. Four (or two instead of four) elongate cutting areas 10 are formed in an outer peripheral surface of the needle portion 5, and gradually spread away from the needle center 9 as the apex. The elongate cutting areas 10 have slopes 11 formed to provide edges extending from the needle center 9 at an acute angle, e.g., about 30 degrees. With the presence of the slopes 11, the needle portion 5 is formed into an umbrella-like shape having an acute apical angle.

Figure 4:
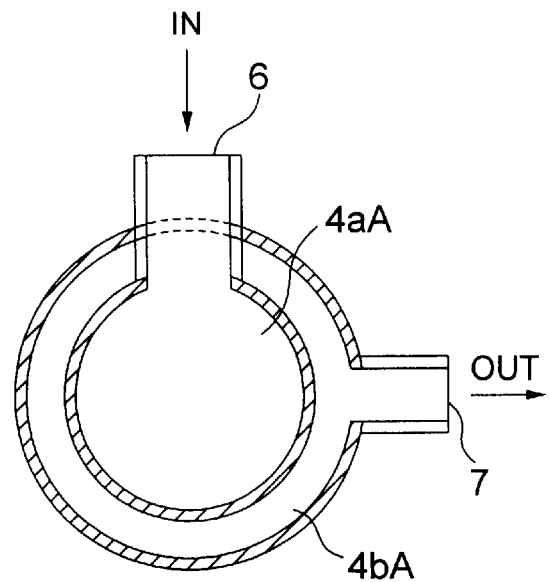
FIG. 4 is a sectional view taken along line A–A' of FIG. 3, showing a rear end of the needle blow nozzle.

A total of four (or at least two) nozzle holes 20 for jetting air are formed near the base of the needle portion 5 between the elongate cutting areas 10. The nozzle holes 20 are each communicated with the air inlet 6 through a first blow portion 4aA defined in the first tubular portion 4a (see FIGS. 3–5). The needle portion 5, the first tubular portion 4a, the second tubular portion 4b, and the base portion 3 are mechanically machined as separate parts. These parts are joined to each other at their joint portions by welding or blazing. If the joined parts are misaligned after the welding or blazing, the parts are machined for centering and rejoined repeatedly so that the needle center is properly positioned at the center of the needle blow nozzle 1 and the needle blow nozzle 1 can develop its ability to easily pierce a parison 58 (see FIG. 6).

Figure 8:
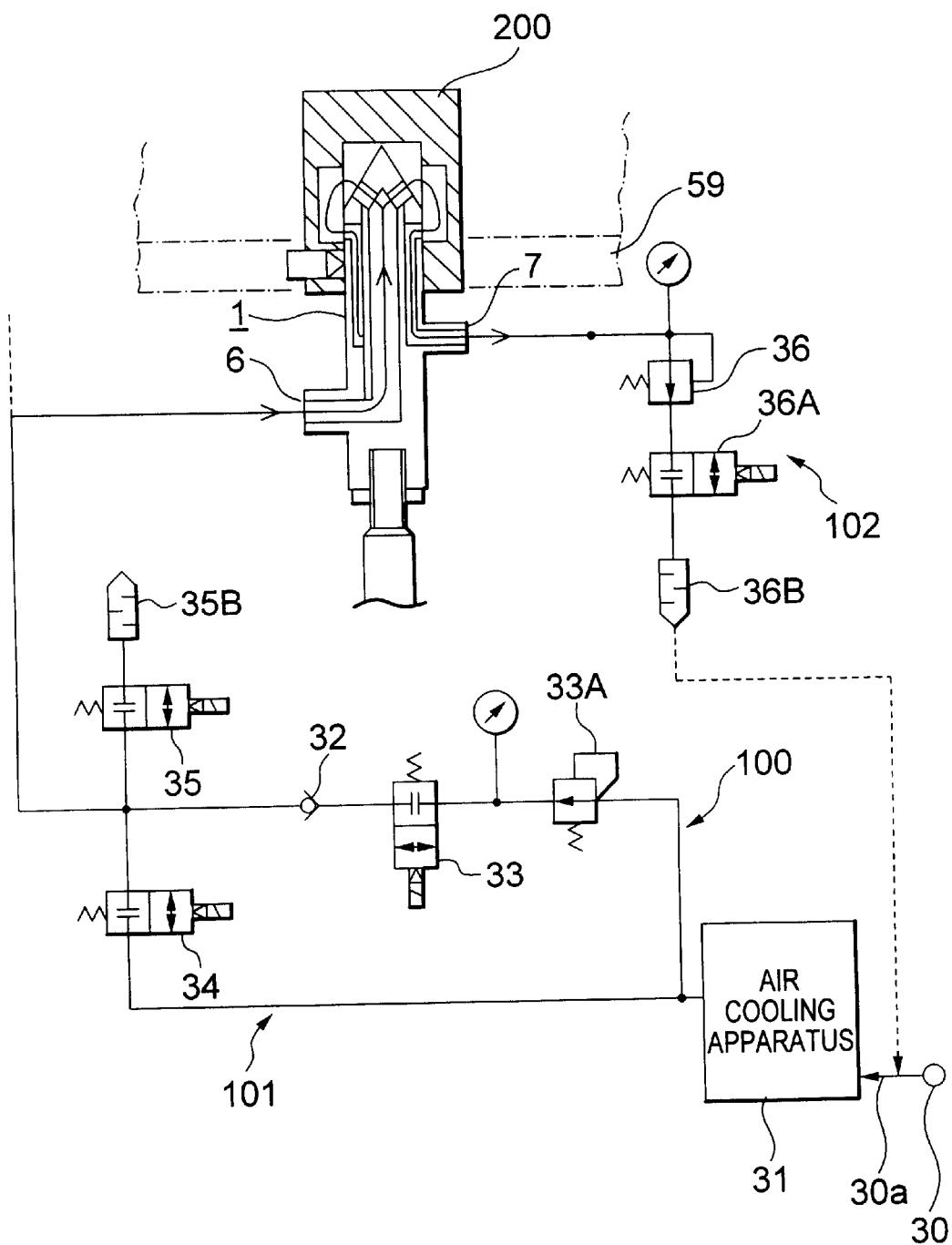
FIG. 8 is a diagram of an air pre-cooling system according to the present invention.

As shown in FIG. 8, high-pressure air 30a from a high-pressure air source 30 is pre-cooled by an air cooling apparatus 31, and is then supplied to the air inlet 6 of the needle blow nozzle 1 through a pre-blow circuit 100 and a main blow circuit 101 which include a check valve 32 and tow valves 33 and 34. After circulating through the needle blow nozzle 1 with the needle portion 5 covered by a cap-like circulation jig 200, the high-pressure air 30a is sent from the air outlet 7 to a circulation circuit 102 which includes valves 36, 36A. With such an arrangement, the high-pressure air 30a is cooled while circulating through the needle blow nozzle 1. In other words, the arrangement of FIG. 8 intends to pre-cool air before the needle blow nozzle 1 is inserted into the parison 58, and after completion of the pre-cooling, the circulation jig 200 is removed and the needle blow nozzle 1 is inserted into the parison 58.

In this connection, the valve 36 on the discharge side functions as a low-pressure relief valve to hold constant the inner pressure in the circulation jig 200, thereby establishing a large difference pressure between the high-pressure blown air and the low-pressure discharged air. When the needle blow nozzle is inserted into the parison 58, the blown air is positively cooled due to adiabatic expansion occurred at the fore end of the needle blow nozzle 1. As a result, the ability of cooling the interior of a molded product 59 can be enhanced and the molding cycle can be shortened in comparison with the conventional cycle. Also, to evacuate the inner air pressure in the molded product 59 in a shorter time, the high-pressure air 30a supplied from the valves 33, 34 and the circuits 100, 101, shown in FIG. 8, is stopped, and the valves 35, 36A are driven to operate so that the interior of the molded product 59 is quickly opened to the atmosphere through the circuits 100, 102 and silencers 35B, 36B. As a result, the inner air pressure in the molded product 59 is reduced to the atmospheric pressure and the molding cycle is shortened.

The air cooling apparatus 31 is provided on a base 50 of the blow molding apparatus 2 shown in FIGS. 6 and 7. First and second fixed plates 51, 52 are provided on the base 50, and a pair of backboards 55, 56 are associated respectively with the first and second fixed plates 51, 52 in such a manner as can be opened and closed by actuators 53, 54 such as motors. Molds 40, 41 cooperating to define a cavity 42 are attached respectively to the backboards 55, 56 in such a manner as can be opened and closed. The parison 58 is ejected from a crosshead 57 and is molded by the molds 40, 41 clamped together. A plurality of needle blow nozzles 1 are connected to the air cooling apparatus 31 through connecting tubes 60, and are installed to move back and forth by cylinders 1a which are provided on the backboard 56 through fixed members 1b. The needle blow nozzles 1 are disposed to reach the interior of the cavity 42 after penetrating both a through hole 56a in the backboard 56 and a through hole 41a in the mold 41. As shown in FIG. 9, each of the cylinders 1a connected via hoses 81, 82 to a solenoid valve 80 for controlling the operation of the cylinder 1a, and the solenoid valve 80 is connected to a driving source 84 and a silencer 83 via lines 85, 89, respectively. A reservoir tank 86 is provided to compensate for deficiency of pressure supply from the driving source 84. For driving the cylinder 1a at a high speed, the pressure from the driving source 84 is increased, and the solenoid valve 80, flow passages of the lines 81, 82, 85, 89 and the silencer 83 are constructed so as to increase an air flow rate. The cylinder 1a is thereby operated at a high speed so that the needle blow nozzle 1 is easily inserted into the parison 58. Because of the parison 58 being formed of a molten resin and having elasticity, if the cylinder 1a is operated at not a high speed but a low speed, the resin would coil round the needle portion 5 of the needle blow nozzle 1 connected to a fore end of the cylinder 1a, and the needle portion 5 would not pierce the parison 58. Thus, as shown in FIG. 9, the blow molding apparatus 2 is constructed such that the needle blow nozzle 1 is laterally inserted into the parison 58 within the molds 40, 41 for blowing air through the nozzle.

The operation of the blow molding apparatus 2 will now be described. First, the air pre-cooling operation is performed with the circulation circuit 102, shown in FIG. 8, in a condition where the molds 40, 41 are kept open. The circulation jig 200 is removed after completion of the pre-cooling. Then, as shown in FIG. 9, the parison 58 is ejected from the crosshead 57 to extend downward vertically, and is pinched at its lower end by a pincher (not shown). In the pinched condition, the parison 58 is held by the molds 40, 41 while pre-blow is applied to the interior of the parison 58 from the crosshead 57 and the molds 40, 41 are gradually closed. Then, the molds 40, 41 are completely closed while the cylinders 1a are operated to insert the needle blow nozzles 1 into the parison 58 for supply of the high-pressure air 30a. After the complete closing of the molds 40, 41, the high-pressure air 30a is supplied to perform blow molding. At this time, since the fore end of the needle portion 5 has an umbrella-like shape, even the needle blow nozzles 1 each having a larger diameter than conventional can be smoothly inserted into the parison 58. Accordingly, the air can be much more easily supplied than conventional, and supply of a large amount of the air forces the parison 58 to be rapidly inflated so as to contact and transfer onto inner walls of the molds 40, 41 in a moment. This results in much better transfer property of the molded product than conventional.

When the high-pressure air 30a from the high-pressure air source 30 is supplied while the needle blow nozzles 1 are inserted into the parison 58, as described above, the fifth valve 36 on the discharge side functions as a low-pressure relief valve to hold constant the inner pressure in the parison 58, thereby establishing a large difference pressure between the high-pressure blown air and the low-pressure discharged air. Accordingly, the blown air is positively cooled in the parison 58 due to adiabatic expansion occurred at the fore end of the needle blow nozzle 1, and the ability of cooling the interior of the parison 58 can be enhanced. The molded product can be thus rapidly cooled in combination with the aforementioned air cooling effect achieved by the air cooling apparatus 31. While the two nozzles 1 are used in FIG. 9, a single nozzle may be provided. Also, the two nozzles 1 may be each of a single cylindrical wall tube and used such that the air is injected through one nozzle and the air is discharged through the other nozzle.

Figure 10:
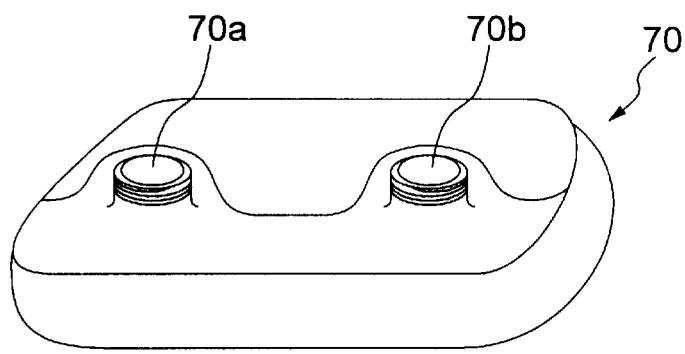
FIG. 10 is a perspective view of a blow molded product according to the present invention.
Figure 11:
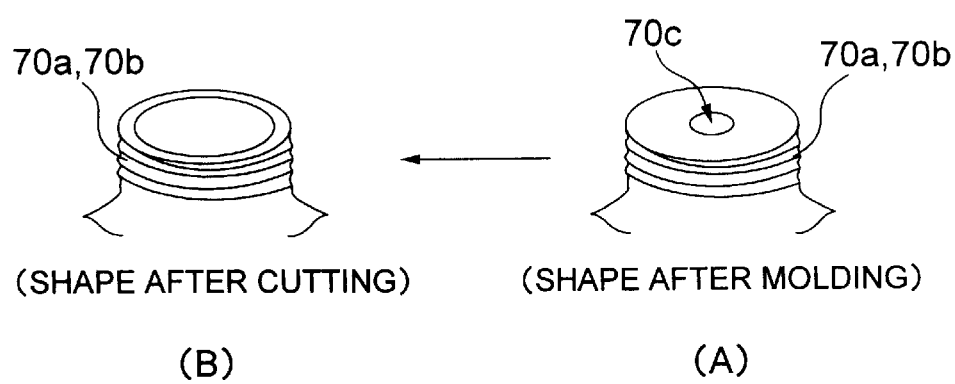
FIG. 11 is explanatory view showing a mouth of the blow molded product of FIG. 10 just after molding and after cutting, respectively.

As shown in FIGS. 10 and 11, a blow molded product 70 formed by the above-described blow molding has a pair of mouths 70a, 70b through which the needle blow nozzles 1 have been inserted. More specifically, just after the blow molding, each mouth 70a, 70b has a shape shown in (A) of FIG. 11, and a hole 70c through which the needle blow nozzle 1 have been inserted is formed as shown. By cutting off an upper end of the mouth 70a, 70b ((B) of FIG. 11), the mouth 70a, 70b has a desired shape after the cutting (see FIG. 10). As a result of removing the upper end of the mouth including the hole 70c, a large hole is formed in the blow molded product 70, whereby refuse in the blow molded product 70 can be easily cleaned up and a device to be installed within the blow molded product 70 can be increased in size and can be more easily installed. In other words, since the nozzles 1 are laterally inserted into the blow molded product 70 through the mouths 70a, 70b, pinched portions 59c, 59d are not required to have such a large thickness as needed conventionally, and the wall thickness of the blow molded product 70 can be reduced. A reduction of the wall thickness also contributes to increasing an inner volume of the blow molded product 70 and cutting down the material cost.

Moreover, since the nozzles are not inserted through the pinched portions 59c, 59d, the pinched portions can be formed into a simple shape that is advantageous in avoiding stress from concentrating to those portions and ensuring a high degree of strength.

With the construction described above, the needle blow nozzle, the air cooling method and apparatus, the blow molding method and apparatus, and the blow molded product according to the present invention can provide advantages below.

Since the fore end of the needle blow nozzle is formed to have an umbrella-like shape in its entirely, even the needle blow nozzle having a larger diameter than conventional can be laterally inserted into the parison with ease. Therefore, the air can be supplied in a larger amount to the interior of the parison in a short time to speed up cooling of the molded product, and the wall thickness of the molded product can be reduced. As a result, the molding cycle can be shortened.

Also, since the air supplied to the needle blow nozzle is pre-cooled by the air cooling apparatus, a period of time necessary for cooling the molded product can be shortened. Further, since the valve on the discharge side of the needle blow nozzle functions as a low-pressure relief valve, the inner pressure in the parison can be held constant to establish a large difference pressure between the high-pressure blown air and the low-pressure discharged air. Accordingly, the blown air can be positively cooled in the parison due to adiabatic expansion occurred at the fore end of the needle blow nozzle.

In addition, since the air is supplied using the nozzle having a larger diameter than conventional, the transfer property of the molded product can be considerably improved with supply of the air in a larger amount.

What is claimed is:

1. A needle blow nozzle comprising:

an elongated tubular body having a needle portion, a needle center, slopes, and nozzle holes, and being laterally inserted into a parison for jetting air to the interior of said parison;

wherein said needle portion is formed at a fore end of said tubular body, said needle center is positioned at an axis of said tubular body, said slopes are formed to extend from said needle center toward an outer peripheral surface of said tubular body providing edges extending at an acute angle, and said nozzle holes are formed in said needle portion;

wherein the elongated tubular body comprises first and second tubular portions.

2. A needle blow nozzle comprising:

an elongated tubular body having a needle portion, a needle center, slopes, and nozzle holes, and being laterally inserted into a parison for jetting air to the interior of said parison;

wherein said needle portion is formed at a fore end of said tubular body, said needle center is positioned at an axis of said tubular body, said slopes are formed to extend from said needle center toward an outer peripheral surface of said tubular body providing edges extending at an acute angle, and said nozzle holes are formed in said needle portion;

wherein at least two elongate cutting areas extending in the axial direction are formed in said slopes, fore ends of said elongate cutting areas are converged to said needle center, and said nozzle holes are positioned between said elongate cutting areas.

3. A blow molding apparatus for molding a blow molded product comprising:

a needle blow nozzle;

a pair of molds for blow molding; and an air cooling apparatus connected to said needle blow nozzle, wherein high-pressure air is supplied to the interior of a molded product through said air cooling apparatus to cause adiabatic expansion, thereby cooling the interior of said molded product, wherein said needle blow nozzle comprises an elongated tubular body having first and second tubular portions, wherein a needle portion formed at a fore end of the tubular body of said needle blow nozzle has a needle center positioned at an axis of said tubular body, slopes providing edges extending at an acute angle are formed to extend from said needle center toward an outer peripheral surface of said tubular body, and nozzle holes are formed in said needle portion.

4. A blow molding apparatus for molding a blow molded product comprising:

a needle blow nozzle;

a pair of molds for blow molding; and an air cooling apparatus connected to said needle blow nozzle, wherein high-pressure air is supplied to the interior of a molded product through said air cooling apparatus to cause adiabatic expansion, thereby cooling the interior of said molded product, wherein a needle portion formed at a fore end of a tubular body of said needle blow nozzle has a needle center positioned at an axis of said tubular body, slopes providing edges extending at an acute angle are formed to extend from said needle center toward an outer peripheral surface of said tubular body, and nozzle holes are formed in said needle portion, wherein at least two elongate cutting areas extending in the axial direction are formed in said slopes, fore ends of said elongate cutting areas are converged to said needle center, and said nozzle holes are positioned between said elongate cutting areas.

5. A needle blow nozzle according to claim 1, wherein at least two elongate cutting areas extending in the axial direction are formed in said slopes, fore ends of said elongate cutting areas are converged to said needle center, and said nozzle holes are positioned between said elongate cutting areas.

6. A blow molding apparatus according to claim 3, wherein at least two elongate cutting areas extending in the axial direction are formed in said slopes, fore ends of said elongate cutting areas are converged to said needle center, and said nozzle holes are positioned between said elongate cutting areas.

* * * * *